(12) United States Patent
Tsai et al.

(10) Patent No.: US 9,826,602 B1
(45) Date of Patent: Nov. 21, 2017

(54) MODULAR TRANSMISSION LINE DEVICE

(71) Applicant: National Chung Cheng University, Chia-Yi (TW)

(72) Inventors: Zuo-Min Tsai, Chia-Yi (TW); Yu-Syuan Wang, Chia-Yi (TW)

(73) Assignee: National Chung Cheng University, Min-Hsiung, Chia-Yi (TW)

( * ) Notice: Subject to any disclaimer, the term of this patent is extended or adjusted under 35 U.S.C. 154(b) by 0 days.

(21) Appl. No.: 15/480,747

(22) Filed: Apr. 6, 2017

(30) Foreign Application Priority Data

Feb. 24, 2017 (TW) .............................. 106106326 A (51) Int. Cl.
| | | |
|---|---|---|
| *H05B 37/00* | (2006.01) | |
| *H05B 37/02* | (2006.01) | |
| *H05B 33/08* | (2006.01) | |
| *F21V 19/00* | (2006.01) | |
| *F21Y 115/10* | (2016.01) | |
| *F21Y 113/13* | (2016.01) | |

(52) U.S. Cl.
CPC ..... *H05B 37/0263* (2013.01); *H05B 33/0845* (2013.01); *F21V 19/004* (2013.01); *F21Y 2113/13* (2016.08); *F21Y 2115/10* (2016.08)

(58) Field of Classification Search
CPC ............ H05B 37/0272; H05B 33/0815; H05B 37/0227; H05B 37/0281; H05B 33/0845; H05B 33/0809; H05B 33/089; H05B 33/0896; H05B 37/0218; H05B 37/0263; H05B 33/0842; H05B 33/0854; H05B 33/0857
See application file for complete search history.

(56) References Cited

U.S. PATENT DOCUMENTS 8,169,185 B2 * 5/2012 Partovi .................. H01F 5/003
320/108
9,119,533 B2 * 9/2015 Ghaffari .................. A61B 1/05

\* cited by examiner

*Primary Examiner* — Monica C King
(74) *Attorney, Agent, or Firm* — Muncy, Geissler, Olds & Lowe, P.C.

(57) ABSTRACT

A modular transmission line device includes a power input module, a transmission line module, a load module and a plurality of LED modules. The power input module, the transmission line module and the load module are sequentially electrically connected and assembled. The power input module transmits an AC voltage to the transmission line module and the load module. The AC voltage is used to generate an electromagnetic wave in the transmission line module according to a loading impedance of the load module and a characteristic impedance of the transmission line module. Each LED module is electrically connected with and assembled with the transmission line module. The LED modules radiates according to the electromagnetic wave.

12 Claims, 11 Drawing Sheets

MODULAR TRANSMISSION LINE DEVICE

This application claims priority for Taiwan patent application no. 106106326 filed on Feb. 24, 2017, the content of which is incorporated by reference in its entirely.

BACKGROUND OF THE INVENTION

Field of the Invention

The present invention relates to a teaching device, particularly to a modular transmission line device.

Description of the Related Art

In life and communication technology, a transmission line is the necessary part of a related hardware circuit. The circuit works by good energy transmission and data delivery. The transmission line is responsible for transmission. Considering different operation frequency and different length, the transmission line may transmit data waves of different behaviors. The behaviors are performed by circuits to achieve effective transmission. As a result, a related theory of the transmission line is described in electronics, circuitry and electromagnetism.

In teaching or specialized books, the introduction of transmission line theory and dynamic behaviors of waves are described by mathematics formulas. The formulas include many parameters of different meanings. The physical meanings are not easily dictated and described by illustration. At present, the teaching resources have less related animations and universal software applied to lessons. Thus, beginning learners confuse with the formulas and difficultly understand the practical meanings of the formulas. Instead, the learners memorize definition and calculation of formulas during a learning process, so not as to understand operation logic of hardware. Such a case may indirectly affect talent training and design development in a specialized field. In order to overcome the problem with abstract formula, the related technology is presently based on software animation. The animation can show the fixed wave of transmission line. A user inputs parameters of transmission line and sees the animation. However, the dynamic wave of software animation comes from algorithms. The more the algorithms, the more the properties of transmission line that the animation shows. The higher the software freedom, the harder a developer designs the software. Accordingly, types, characteristic simulation and parameters of transmission line are limited.

To overcome the abovementioned problems, the present invention provides a modular transmission line device, so as to solve the afore-mentioned problems of the prior art.

SUMMARY OF THE INVENTION

A primary objective of the present invention is to provide a modular transmission line device, which assembles a power input module, a transmission line module, a load module and a plurality of LED modules. Not limited by types of a transmission line of software, the modular transmission line device uses the lighting states of LEDs to directly realize variation and movement of an electromagnetic wave in the transmission line. A characteristic impedance of the transmission line module and a loading impedance of the load module are freely changed to synchronously adjust parameters of the transmission line and overcome the problem with abstract formulas to help beginning learners learn. Besides, a user can manually assemble the transmission line module to improve more interactivity with tools than software.

To achieve the abovementioned objectives, the present invention provides a modular transmission line device, which includes a power input module, a transmission line module, a load module and a plurality of light-emitting diodes (LED) modules. The power input module has a first connection port and receives an alternative-current (AC) voltage. The transmission line module has a second connection port, a third connection port and a plurality of fourth connection ports, and the second connection port is electrically connected with the first connection port to transmit the AC voltage to the transmission line module. The load module has a fifth connection port, and the fifth connection port is electrically connected with the third connection port to transmit the AC voltage to the load module, and the AC voltage is used to generate an electromagnetic wave in the transmission line module according to a loading impedance of the load module and a characteristic impedance of the transmission line module. Each LED module has a sixth connection port, and the sixth connection ports of the LED modules are respectively electrically connected with the fourth connection ports, and the LED modules radiate according to the electromagnetic wave.

In an embodiment of the present invention, the power input module further comprises a first circuit board provided with the first connection port and electrically connected with the first connection port; and two first banana plugs arranged on the first circuit board and electrically connected with the first connection port through the first circuit board, and the first banana plugs receive the AC voltage.

In an embodiment of the present invention, the transmission line module further comprises: a first transmission line submodule having one fourth connection port, the second connection port and a seventh connection port; a plurality of second transmission line submodules each having one fourth connection port, a eighth connection port and a ninth connection port, and the second transmission line submodules are connected in series and electrically connected through the eighth connection port and the ninth connection port, and the second transmission line submodules are electrically connected with the first transmission line submodule through the seventh connection port and the eighth connection port; and a third transmission line submodule having one fourth connection port, the third connection port and a tenth connection port and electrically connected with the second transmission line submodules through the ninth connection port and the tenth connection port, and the first transmission line submodule, the second transmission line submodules and the third transmission line submodule have the characteristic impedance and receive the AC voltage, and the electromagnetic wave is generated in the first transmission line submodule, the second transmission line submodules and the third transmission line submodule.

In an embodiment of the present invention, the first transmission line submodule further comprises: a second circuit board provided with the fourth connection port, the second connection port and the seventh connection port and electrically connected with the fourth connection port, the second connection port and the seventh connection port; and a first inductor and a first capacitor arranged on the second circuit board, and one end of the first inductor is electrically connected with the second connection port, and another end of the first inductor is electrically connected with the seventh connection port and electrically connected with a grounding terminal through the first capacitor. Each second transmission line submodule further comprises: a third circuit board provided with the fourth connection port, the eighth connection port and the ninth connection port and electrically connected with the fourth connection port, the eighth connection port and the ninth connection port; and a second inductor and a second capacitor arranged on the third circuit board, and one end of the second inductor is electrically connected with the eighth connection port, and another end of the second inductor is electrically connected with the ninth connection port and electrically connected with the grounding terminal through the second capacitor. The third transmission line submodule further comprises: a fourth circuit board provided with the fourth connection port, the third connection port and the tenth connection port and electrically connected with the fourth connection port, the third connection port and the tenth connection port; and a third inductor and a third capacitor arranged on the fourth circuit board, and one end of the third inductor is electrically connected with the third connection port, and another end of the third inductor is electrically connected with the tenth connection port and electrically connected with the grounding terminal through the third capacitor, and the first capacitor, the second capacitors, the third capacitor, the first inductor, the second inductors and the third inductor have the characteristic impedance, and the electromagnetic wave is generated in the first capacitor, the second capacitors, the third capacitor, the first inductor, the second inductors and the third inductor.

In an embodiment of the present invention, the first transmission line submodule further comprises a first pin header electrically connected with the second circuit board, and the first capacitor is arranged on and electrically connected with the first pin header. The second transmission line submodule further comprises a second pin header electrically connected with the third circuit board, and the second capacitor is arranged on and electrically connected with the second pin header. The third transmission line submodule further comprises a third pin header electrically connected with the fourth circuit board, and the third capacitor is arranged on and electrically connected with the third pin header.

In an embodiment of the present invention, the load module further comprises: a fifth circuit board provided with the fifth connection port and electrically connected with the fifth connection port; and a resistor arranged on the fifth circuit board, and one end of the resistor is electrically connected with the fifth connection port, and another end of the resistor is electrically connected with the grounding terminal, and the resistor receives the AC voltage, and the resistor has the loading impedance.

In an embodiment of the present invention, the load module further comprises a fourth pin header electrically connected with the fifth circuit board, and the resistor is arranged on and electrically connected with the fourth pin header.

In an embodiment of the present invention, each LED module further comprises: a sixth circuit board provided with the sixth connection port and electrically connected with the sixth connection port; a first LED arranged on the sixth circuit board, and an anode and a cathode of the first LED are respectively electrically connected with the sixth connection port and the grounding terminal, and the first LED radiates according to the electromagnetic wave; and a second LED arranged on the sixth circuit board, and a cathode and an anode of the second LED are respectively electrically connected with the sixth connection port and the grounding terminal, and the second LED radiates according to the electromagnetic wave, and the first LED and the second LED are of different color.

In an embodiment of the present invention, the power input module further comprises two second banana plugs arranged on the first circuit board and electrically connected with the first connection port through the first circuit board, and the second banana plugs receive a direct-current (DC) voltage; and each LED module further comprises an amplifier circuit arranged on the sixth circuit board, the anode of the first LED and the cathode of the second LED are electrically connected with the sixth connection port through the amplifier circuit, the amplifier circuit receives the DC voltage to amplify the electromagnetic wave, and then transmits the electromagnetic wave to the first LED or the second LED.

In an embodiment of the present invention, the first circuit board, the second circuit board, the third circuit board, the fourth circuit board, the fifth circuit board, and the sixth circuit board are printed circuit boards (PCBs).

In an embodiment of the present invention, the first connection port, the second connection port, the third connection port, the fourth connection port, the fifth connection port, the sixth connection port, the seventh connection port, the eighth connection port, the ninth connection port and the tenth connection port are USB ports.

In an embodiment of the present invention, the first LED and the second LED are respectively a red LED and a green LED.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Refer to FIG. 1, FIG. 2, FIG. 3, FIG. 4, FIG. 5, FIG. 6, FIG. 7 and FIG. 8. The modular transmission line device of the present invention is introduced as below. The modular transmission line device of the present invention comprises a power input module 10, a transmission line module 12, a load module 14 and a plurality of light-emitting diodes (LED) modules 16. The power input module 10 has a first connection port 18 and receives an alternative-current (AC) voltage VS. The transmission line module 12 has a second connection port 20, a third connection port 22 and a plurality of fourth connection ports 24, and the second connection port 20 is electrically connected with the first connection port 18 to transmit the AC voltage VS to the transmission line module 12. The load module 14 has a fifth connection port 26, and the fifth connection port 26 is electrically connected with the third connection port 22 to transmit the AC voltage VS to the load module 14, and the AC voltage VS is used to generate an electromagnetic wave in the transmission line module 12 according to a loading impedance of the load module 14 and a characteristic impedance of the transmission line module 12. Each LED module 16 has a sixth connection port 28, and the sixth connection ports 28 of the LED modules 16 are respectively electrically connected with the fourth connection ports 24, and the LED modules 16 radiate according to the electromagnetic wave.

Figure 3:
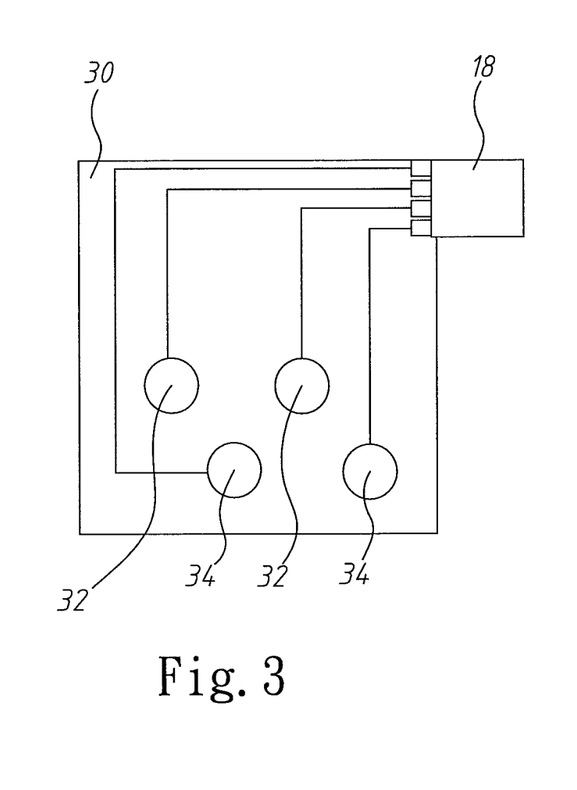
FIG. 3 is a diagram schematically showing a power input module according to an embodiment of the present invention.

The power input module 10 further comprises a first circuit board 30, two first banana plugs 32 and two second banana plugs 34. The first circuit board 30 is provided with the first connection port 18 and electrically connected with the first connection port 18. The first banana plugs 32 are arranged on the first circuit board 30 and electrically connected with the first connection port 18 through the first circuit board 30, and the first banana plugs 32 receive the AC voltage VS. The second banana plugs 34 are arranged on the first circuit board 30 and electrically connected with the first connection port 18 through the first circuit board 18, and the second banana plugs 34 receive a direct-current (DC) voltage VDD.

The transmission line module 12 further comprises a first transmission line submodule 36, a plurality of second transmission line submodules 38 and a third transmission line submodule 40. The first transmission line submodule 36 has one fourth connection port 24, the second connection port 20 and a seventh connection port 42. Each second transmission line submodule 38 has one fourth connection port 24, a eighth connection port 44 and a ninth connection port 46, and the second transmission line submodules 38 are connected in series and electrically connected through the eighth connection port 44 and the ninth connection port 46, and the second transmission line submodules 38 are electrically connected with the first transmission line submodule 36 through the seventh connection port 42 and the eighth connection port 44. The third transmission line submodule 40 has one fourth connection port 24, the third connection port 22 and a tenth connection port 48 and electrically connected with the second transmission line submodules 38 through the ninth connection port 46 and the tenth connection port 48. The first transmission line submodule 36, the second transmission line submodules 38 and the third transmission line submodule 40 have the characteristic impedance and receive the AC voltage VS, and the electromagnetic wave is generated in the first transmission line submodule 36, the second transmission line submodules 38 and the third transmission line submodule 40. For example, in the embodiment, the first connection port 18, the second connection port 20, the third connection port 22, the fourth connection port 24, the fifth connection port 26, the sixth connection port 28, the seventh connection port 42, the eighth connection port 44, the ninth connection port 46 and the tenth connection port 48 are USB ports, but the present invention is not limited thereto. In the embodiment, the first transmission line submodule 36, the second transmission line submodules 38 and the third transmission line submodule 40 form a straight transmission line. Besides, the first transmission line submodule 36, the second transmission line submodules 38 and the third transmission line submodule 40 use more ports to form transmission lines with different shape, such as microstripe lines including a Wilkinson power divider and a branch line coupler.

Figure 4:
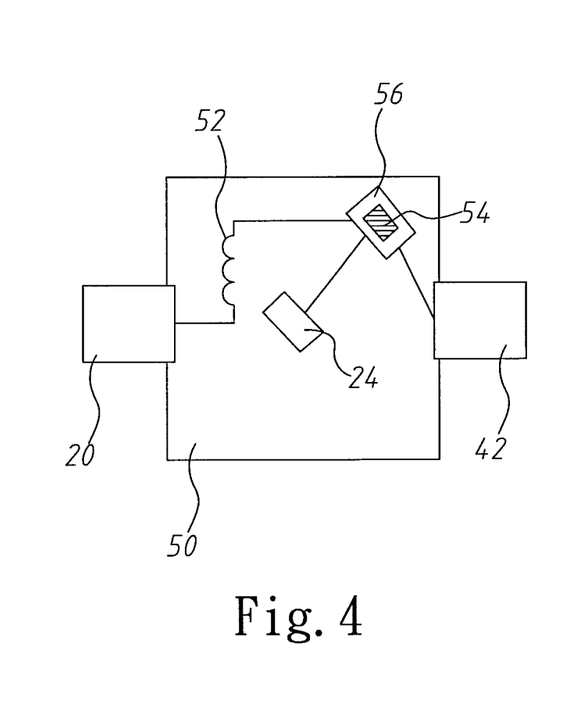
FIG. 4 is a diagram schematically showing a first transmission line submodule according to an embodiment of the present invention.

The first transmission line submodule 36 further comprises a second circuit board 50, a first inductor 52, a first capacitor 54 and a first pin header 56. The second circuit board 50 is provided with the fourth connection port 24, the second connection port 20 and the seventh connection port 42 and electrically connected with the fourth connection port 24, the second connection port 20 and the seventh connection port 42. The first inductor 52 and the first capacitor 54 are arranged on the second circuit board 50, and one end of the first inductor 52 is electrically connected with the second connection port 20, and another end of the first inductor 52 is electrically connected with the seventh connection port 42 and electrically connected with a grounding terminal through the first capacitor 54. The first pin header 56 is electrically connected with the second circuit board 50, and the first capacitor 54 is arranged on and electrically connected with the first pin header 56. A user can freely decide to a type and a value of the first capacitor 54 inserting into the first pin header 56, such that the transmission line module 12 has different characteristic impedances and improves more interactivity with tools than software.

Figure 5:
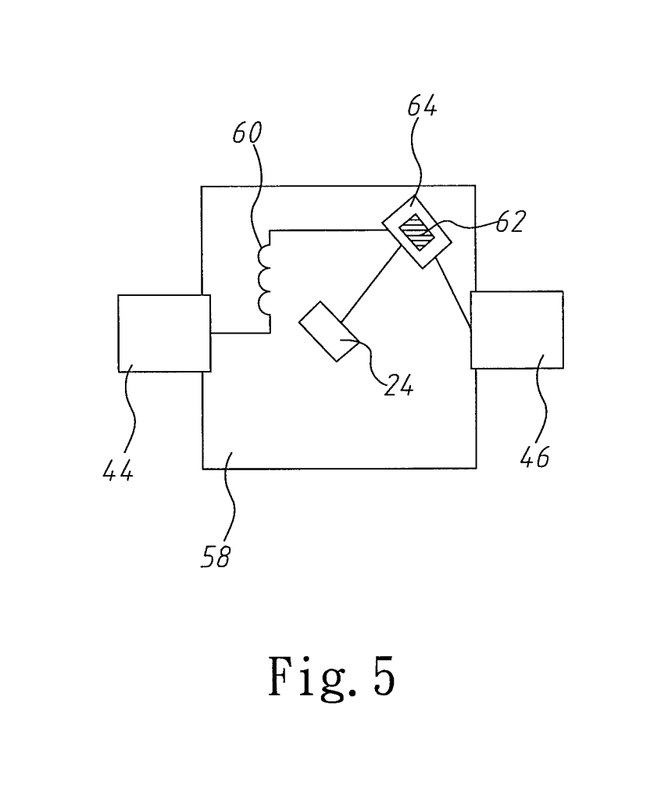
FIG. 5 is a diagram schematically showing a second transmission line submodule according to an embodiment of the present invention.

Each second transmission line submodule 38 further comprises a third circuit board 58, a second inductor 60 a second capacitor 62 and a second pin header 64. The third circuit board 58 is provided with the fourth connection port 24, the eighth connection port 44 and the ninth connection port 46 and electrically connected with the fourth connection port 24, the eighth connection port 44 and the ninth connection port 46. The second inductor 60 and the second capacitor 62 are arranged on the third circuit board 58, and one end of the second inductor 60 is electrically connected with the eighth connection port 44, and another end of the second inductor 60 is electrically connected with the ninth connection port 46 and electrically connected with the grounding terminal through the second capacitor 62. The second pin header 64 is electrically connected with the third circuit board 58, and the second capacitor 62 is arranged on and electrically connected with the second pin header 64. The user can freely decide to a type and a value of the second capacitor 62 inserting into the second pin header 64, such that the transmission line module 12 has different characteristic impedances and improves more interactivity with tools than software.

Figure 6:
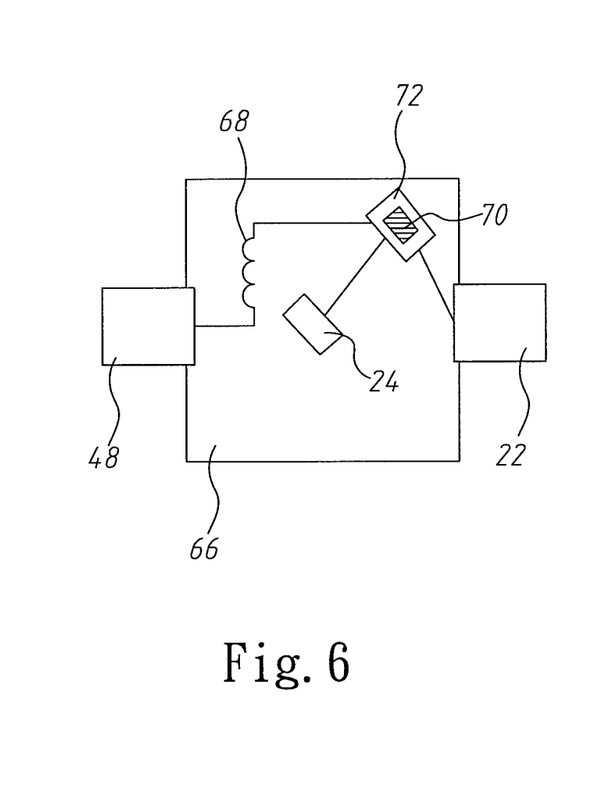
FIG. 6 is a diagram schematically showing a third transmission line submodule according to an embodiment of the present invention.

The third transmission line submodule 40 further comprises a fourth circuit board 66, a third inductor 68, a third capacitor 70 and a third pin header 72. The fourth circuit board 66 is provided with the fourth connection port 24, the third connection port 22 and the tenth connection port 48 and electrically connected with the fourth connection port 24, the third connection port 22 and the tenth connection port 48. The third inductor 68 and the third capacitor 70 are arranged on the fourth circuit board 66, and one end of the third inductor 68 is electrically connected with the third connection port 22, and another end of the third inductor 68 is electrically connected with the tenth connection port 48 and electrically connected with the grounding terminal through the third capacitor 70, and the first capacitor 54, the second capacitors 62, the third capacitor 70, the first inductor 52, the second inductors 60 and the third inductor 70 have the characteristic impedance, and the electromagnetic wave is generated in the first capacitor 54, the second capacitors 62, the third capacitor 70, the first inductor 52, the second inductors 60 and the third inductor 70. The third pin header 72 is electrically connected with the fourth circuit board 66, and the third capacitor 70 is arranged on and electrically connected with the third pin header 72. The user can freely decide to a type and a value of the third capacitor 70 inserting into the third pin header 72, such that the transmission line module 12 has different characteristic impedances and improves more interactivity with tools than software.

Figure 7:
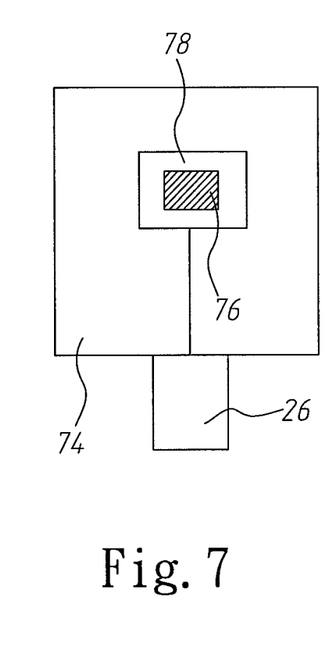
FIG. 7 is a diagram schematically showing a load module according to an embodiment of the present invention.

The load module 14 further comprises a fifth circuit board 74, a resistor 76 and a fourth pin header 78. The fifth circuit board 74 is provided with the fifth connection port 26 and electrically connected with the fifth connection port 26. The resistor 76 is arranged on the fifth circuit board 74, and one end of the resistor 76 is electrically connected with the fifth connection port 74, and another end of the resistor 76 is electrically connected with the grounding terminal, and the resistor 76 receives the AC voltage VS, and the resistor 76 has the loading impedance. The fourth pin header 78 is electrically connected with the fifth circuit board 74, and the resistor 76 is arranged on and electrically connected with the fourth pin header 78. The user can freely decide to a value of the resistor 76 or the other element inserting into the fourth pin header 78, such that the load module 14 has different characteristic impedances and improves more interactivity with tools than software. Since the present invention can freely adjust the characteristic impedance and the loading impedance to comply with mathematics demonstration and overcome the problem with abstract formulas, the present invention applies to teaching tools to favor learning.

Figure 8:
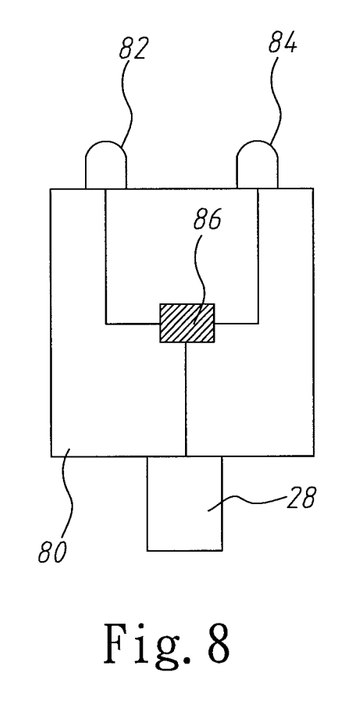
FIG. 8 is a diagram schematically showing a LED module according to an embodiment of the present invention.

Each LED module 16 further comprises a sixth circuit board 80, a first LED 82, a second LED 84 and an amplifier circuit 86. For example, the first circuit board 30, the second circuit board 50, the third circuit board 58, the fourth circuit board 66, the fifth circuit board 74, and the sixth circuit board 80 are printed circuit boards (PCBs), but the present invention is not limited thereto. The sixth circuit board 80 is provided with the sixth connection port 28 and electrically connected with the sixth connection port 28. The first LED 82 is arranged on the sixth circuit board 80, and an anode and a cathode of the first LED 82 are respectively electrically connected with the sixth connection port 28 and the grounding terminal, and the first LED 82 radiates according to the electromagnetic wave. The first LED 82 and the second LED 84 are of different color. For example, the first LED 82 and the second LED 84 are respectively a red LED and a green LED. The second LED 84 is arranged on the sixth circuit board 80, and a cathode and an anode of the second LED 84 are respectively electrically connected with the sixth connection port 28 and the grounding terminal, and the second LED 84 radiates according to the electromagnetic wave. In other words, the first LED 82 and the second LED 84 are inversely connected in parallel. Red denotes a positive voltage of the electromagnetic wave, and green denotes a negative voltage of the electromagnetic wave. When the first LED 82 and the second LED 84 regularly radiate, a naked eye can observe the propagation and properties of the electromagnetic wave in the transmission line module 12 according to the color and brightness of the first LED 82 and the second LED 84, not limited by types of a transmission line of software. The amplifier circuit 86 is arranged on the sixth circuit board 80, the anode of the first LED 82 and the cathode of the second LED 84 are electrically connected with the sixth connection port 28 through the amplifier circuit 86, the amplifier circuit 86 receives the DC voltage VDD to amplify the electromagnetic wave, and then transmits the electromagnetic wave to the first LED 82 or the second LED 84, lest the electromagnetic wave be too weak to drive the first LED 82 or the second LED 84.

When the AC voltage VS and the DC voltage VDD are provided to the first banana plugs 32 and the second banana plugs 34, the AC voltage VS is used to generate the electromagnetic wave according to the loading impedance of the load module 14 and the characteristic impedance of the transmission line module 12. Simultaneously, the amplifier circuit 86 receives the DC voltage VDD to amplify the electromagnetic wave, so as to drive the first LED 82 and the second LED 84. Thus, the first LED 82 and the second LED 84 regularly radiate, which is provided to the user for observing the variation of the electromagnetic wave in the transmission line module 12, such as propagation, reflection, dissipation and interference of waves.

Figure 1:
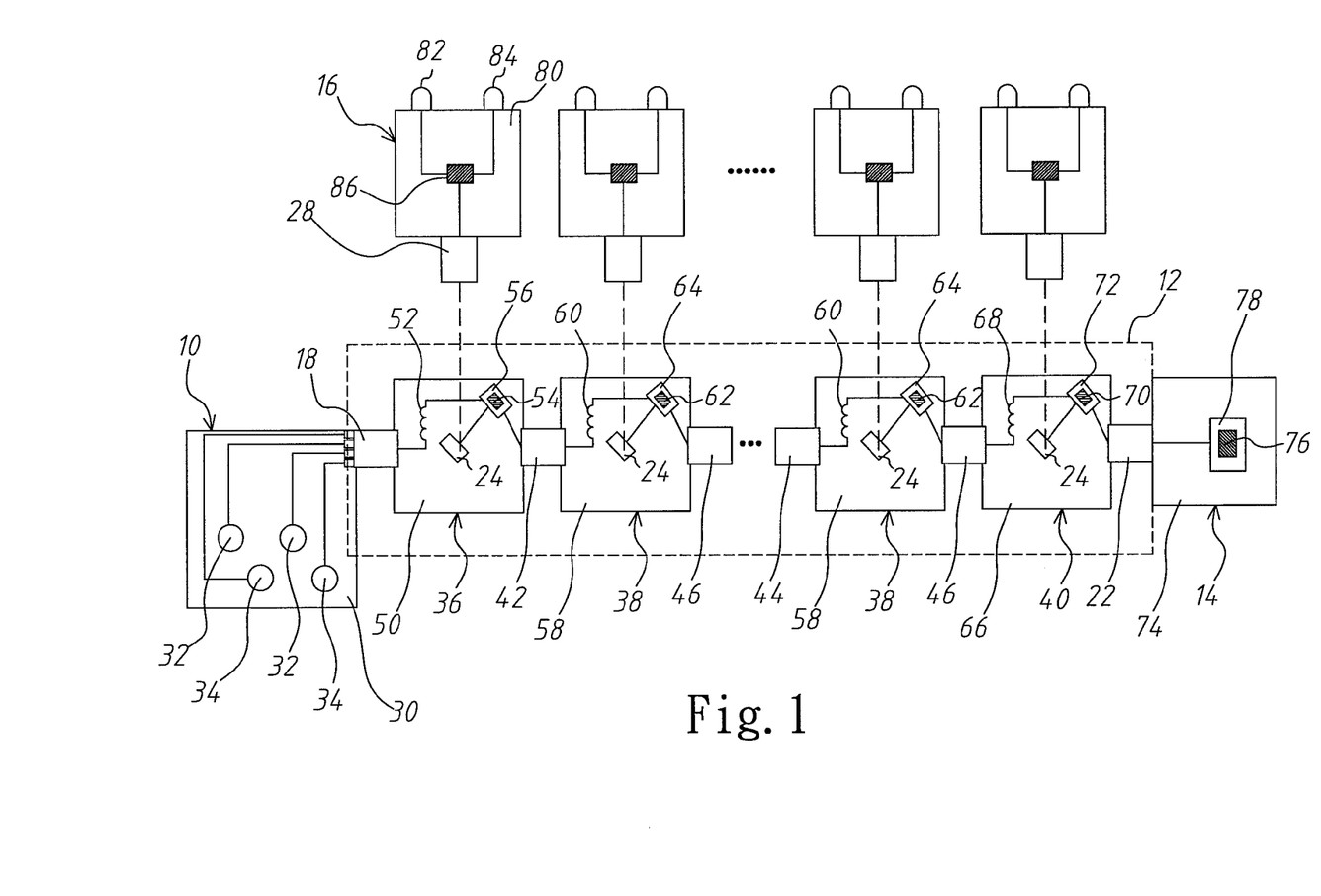
FIG. 1 is a diagram schematically showing a modular transmission line device according to an embodiment of the present invention.
Figure 2:
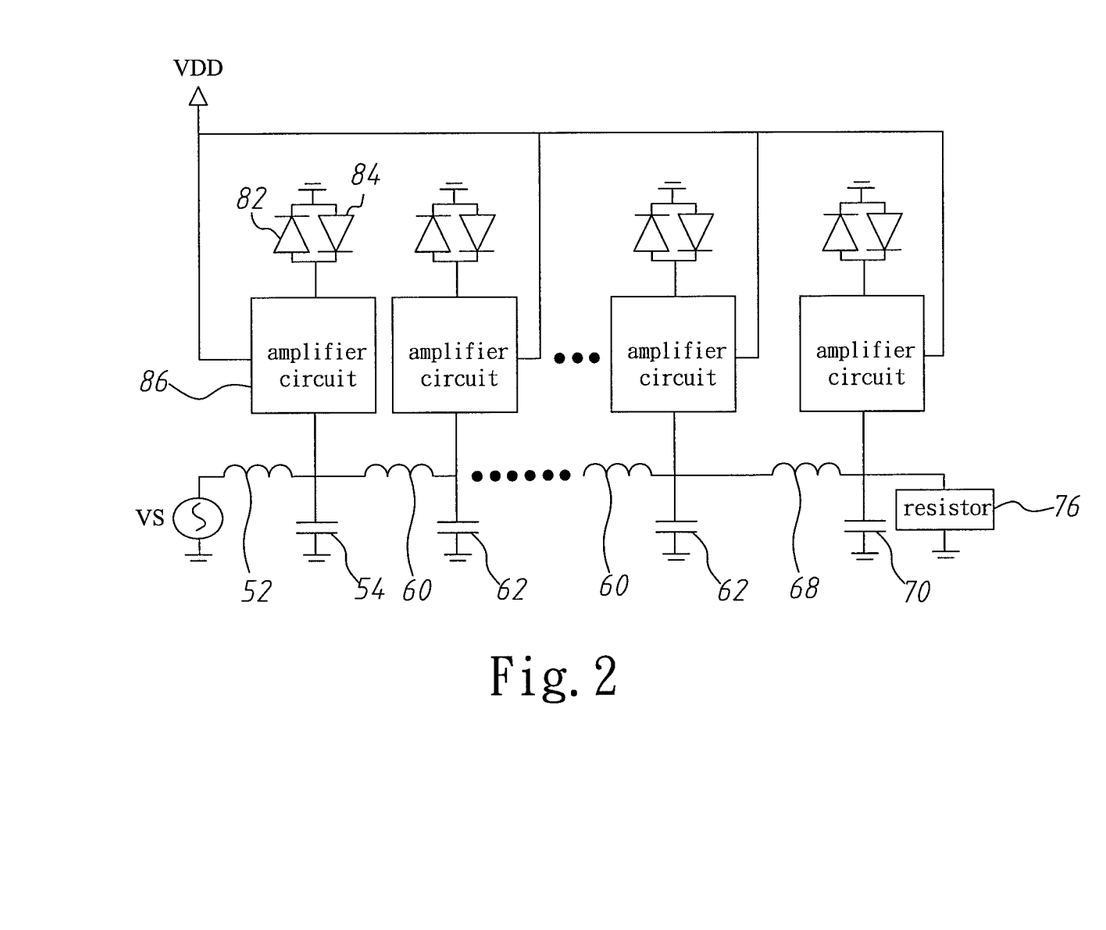
FIG. 2 is a diagram schematically showing an equivalent circuit of a modular transmission line device according to another embodiment of the present invention.
Figure 9:
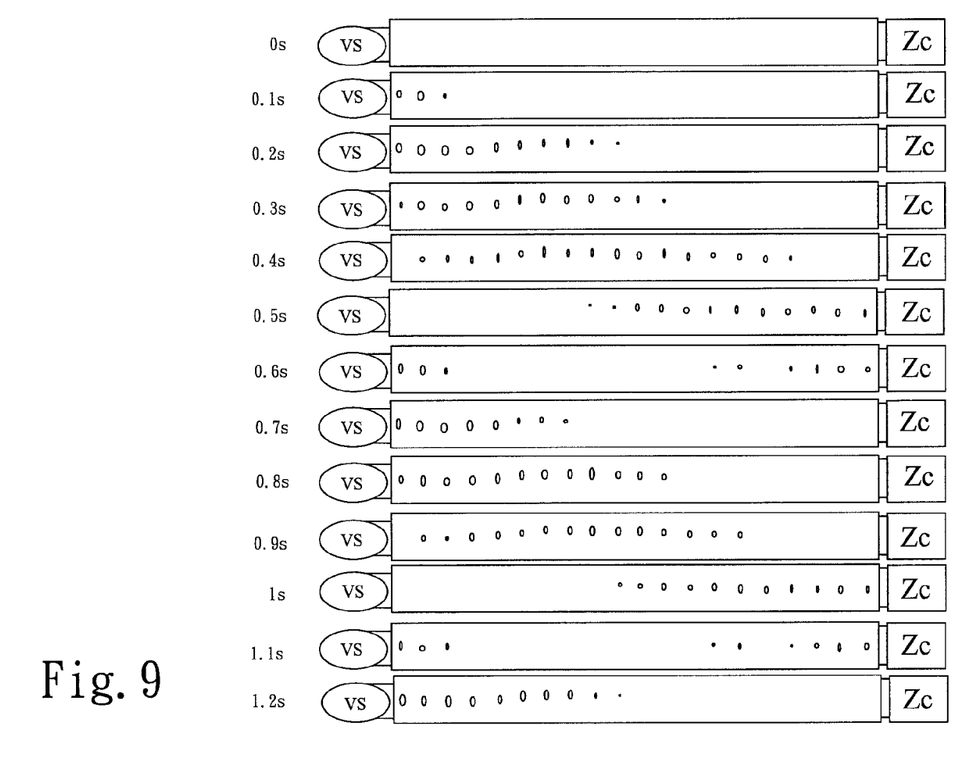
FIG. 9 is a diagram schematically showing a LED module radiating to represent an electromagnetic wave propagating in a transmission line according to an embodiment of the present invention.

Refer to FIG. 1 and FIG. 9. In FIG. 9, the AC voltage VS has an amplitude of 90 mV and a frequency of 1 Hz, and the loading impedance equals to the characteristic impedance Zc. That is to say, the loading impedance matches the characteristic impedance Zc. FIG. 9 is a diagram schematically showing a LED module radiating to represent an electromagnetic wave propagating in a transmission line according to an embodiment of the present invention, wherein a large circle denotes high brightness, and a small circle denotes low brightness. FIG. 9 shows the lighting states of the LED modules 16 after 0 s, 0.1 s, 0.2 s, 0.3 s, 0.4 s, 0.5 s, 0.6 s, 0.7 s, 0.8 s, 0.9 s, 1 s, 1.1 s and 1.2 s. From FIG. 9, it is known that the wave moves in the transmission line with time. In other words, displacement and energy of the wave are respectively produced and transmitted.

Figure 10:
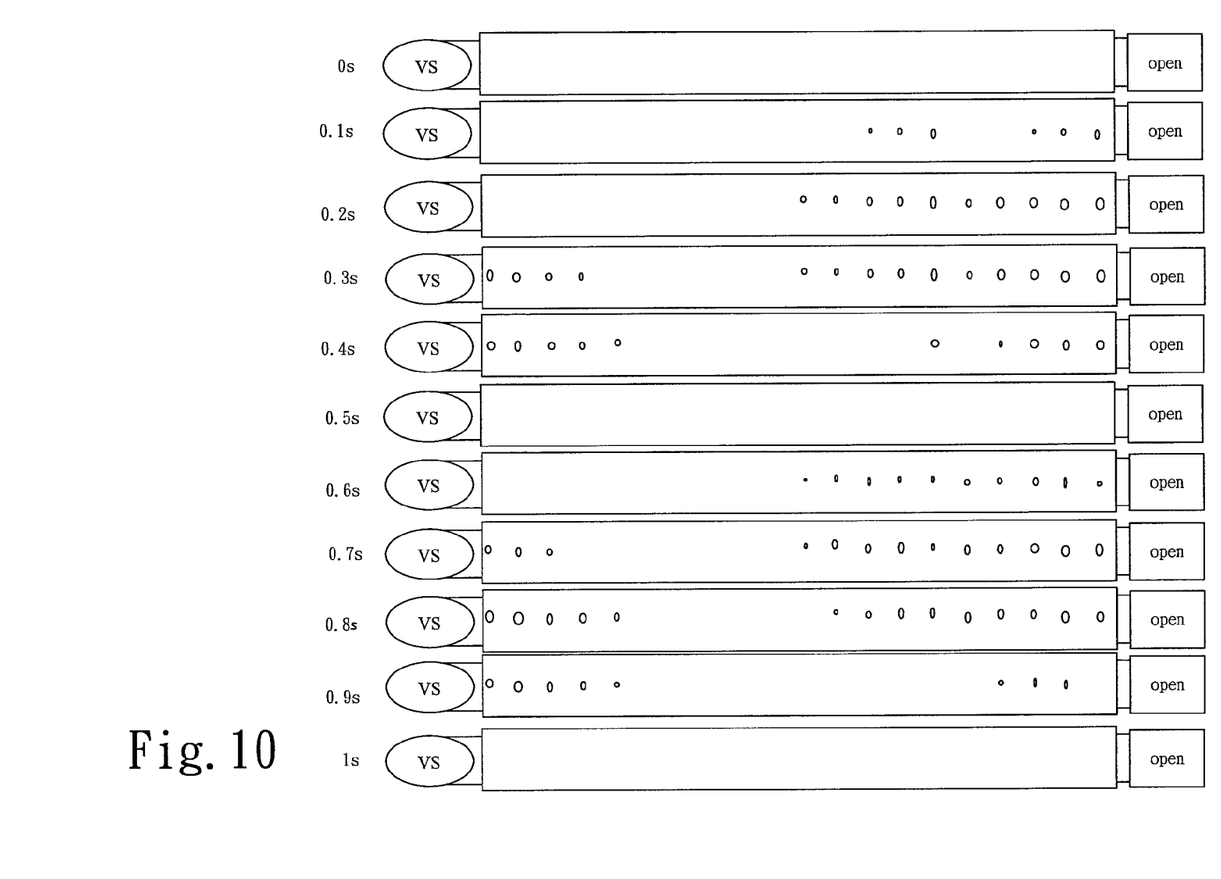
FIG. 10 and FIG. 11 are diagrams respectively schematically showing a LED module radiating to represent a standing wave in a transmission line according to an embodiment of the present invention.
Figure 11:
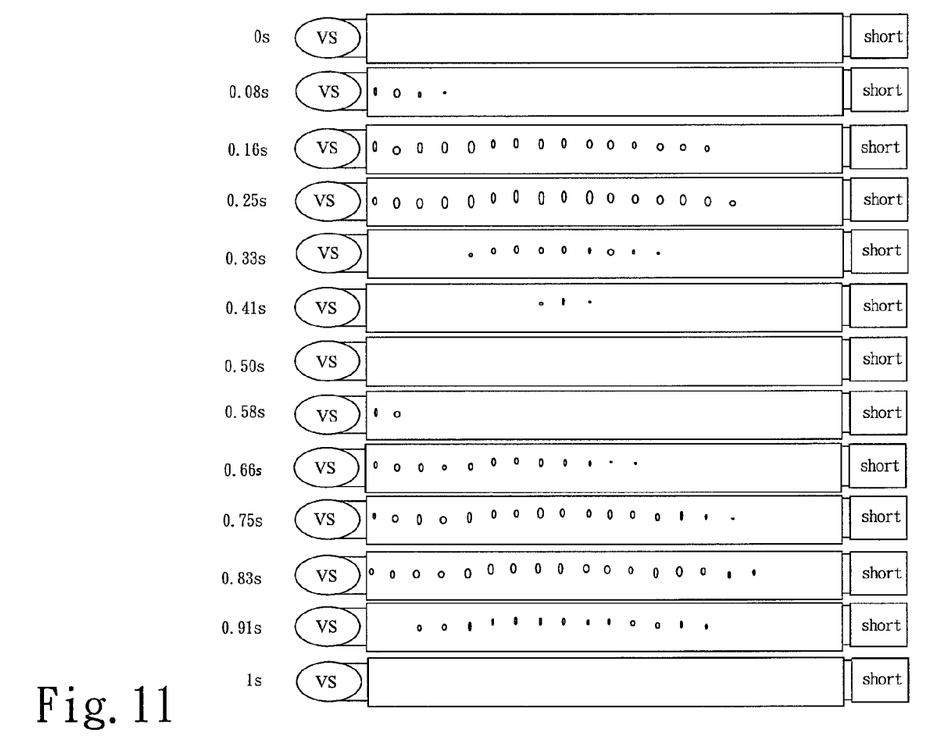

Refer to FIG. 1, FIG. 10 and FIG. 11. In FIG. 10, the AC voltage VS has an amplitude of 90 mV and a frequency of 1 Hz, and the load module 14 is open circuit. In FIG. 11, the AC voltage VS has an amplitude of 90 mV and a frequency of 1 Hz, and the load module 14 is short circuit. FIG. 10 and FIG. 11 are diagrams respectively schematically showing a LED module radiating to represent a standing wave in a transmission line according to an embodiment of the present invention, wherein a large circle denotes high brightness, and a small circle denotes low brightness. FIG. 10 shows the lighting states of the LED modules 16 after 0 s, 0.1 s, 0.2 s, 0.3 s, 0.4 s, 0.5 s, 0.6 s, 0.7 s, 0.8 s, 0.9 s and 1 s. FIG. 11 shows the lighting states of the LED modules 16 after 0 s, 0.08 s, 0.16 s, 0.25 s, 0.33 s, 0.41 s, 0.50 s, 0.58 s, 0.66 s, 0.75 s, 0.83 s, 0.91 s and 1 s. From FIG. 10 and FIG. 11, it is known that the standing wave has nodes and antinodes. The nodes have no energy, and the antinodes have the largest energy. Energy does not be transmitted in the transmission line with time. In other words, displacement of the wave is not produced. In FIG. 10 and FIG. 11, brightness positions and darkness positions are fixed, which represents the energy not to be transmitted.

The characteristic impedance of the transmission line has to ideally match the impedance of the load, such that the load completely receives the signal from an electrical source. If the characteristic impedance of the transmission line does not match the impedance of the load, the load reflects the signal from the electrical source. The reflected signal is endlessly transmitted until it is dissipated or absorbed by the load that matches the transmission line. Besides, the matching degree of the impedance of the load can affect the phase difference between a reflection signal and an input signal.

Figure 12:
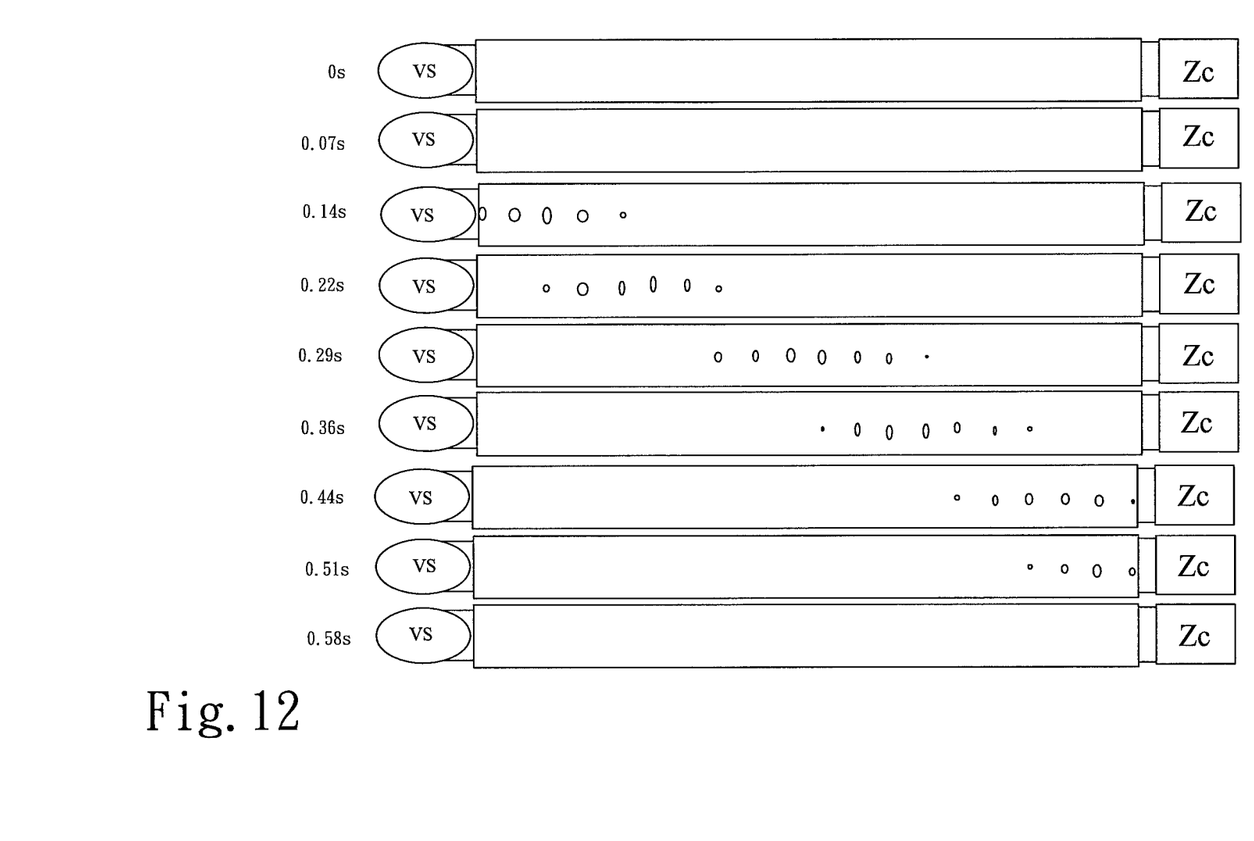
FIG. 12 is a diagram schematically showing a LED module radiating to represent an electromagnetic wave in a transmission line when a characteristic impedance matches a loading impedance according to an embodiment of the present invention.

Refer to FIG. 1 and FIG. 12. In FIG. 12, the AC voltage VS has an amplitude of 90 mV and a frequency of 10 Hz, and the loading impedance equals to the characteristic impedance Zc. That is to say, the loading impedance matches the characteristic impedance Zc. A large circle denotes high brightness, and a small circle denotes low brightness. FIG. 12 shows the lighting states of the LED modules 16 after 0 s, 0.07 s, 0.14 s, 0.22 s, 0.29 s, 0.36 s, 0.44 s, 0.51 s and 0.58 s. From FIG. 12, it is known that the wave disappears in the transmission line module 12 after the wave is transmitted to and absorbed by the load module 14.

Figure 13:
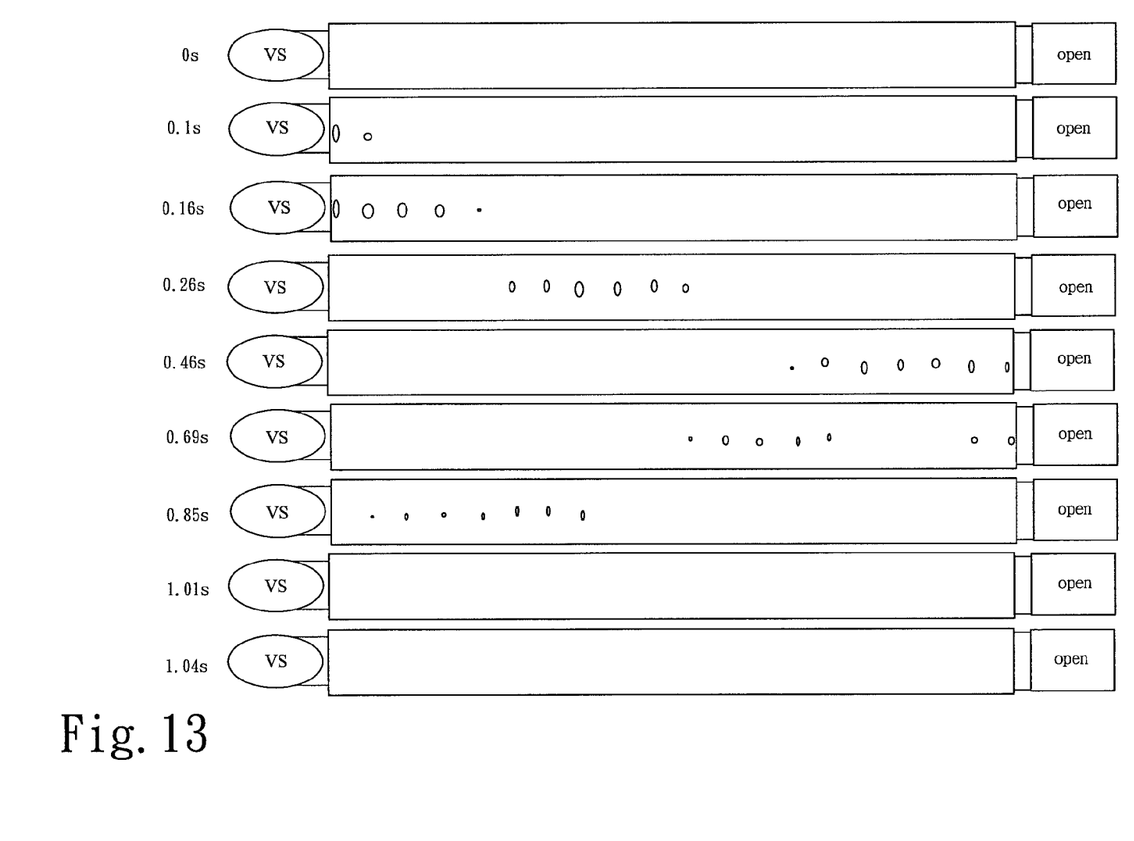
FIG. 13 is a diagram schematically showing a LED module radiating to represent an electromagnetic wave in a transmission line when a load module is open circuit according to an embodiment of the present invention.

Refer to FIG. 1 and FIG. 13. In FIG. 13, the AC voltage VS has an amplitude of 90 mV and a frequency of 10 Hz, and the load module 14 is open circuit. A large circle denotes high brightness, and a small circle denotes low brightness. FIG. 13 shows the lighting states of the LED modules 16 after 0 s, 0.1 s, 0.16 s, 0.26 s, 0.46 s, 0.69 s, 0.85 s, 1.01 s and 1.04 s. From FIG. 13, it is known that the wave inversely propagates in the transmission line module 12 and the color of the LEDs representing the wave keeps unchanged. In other words, there is no phase difference between an incident wave and a reflection wave.

Figure 14:
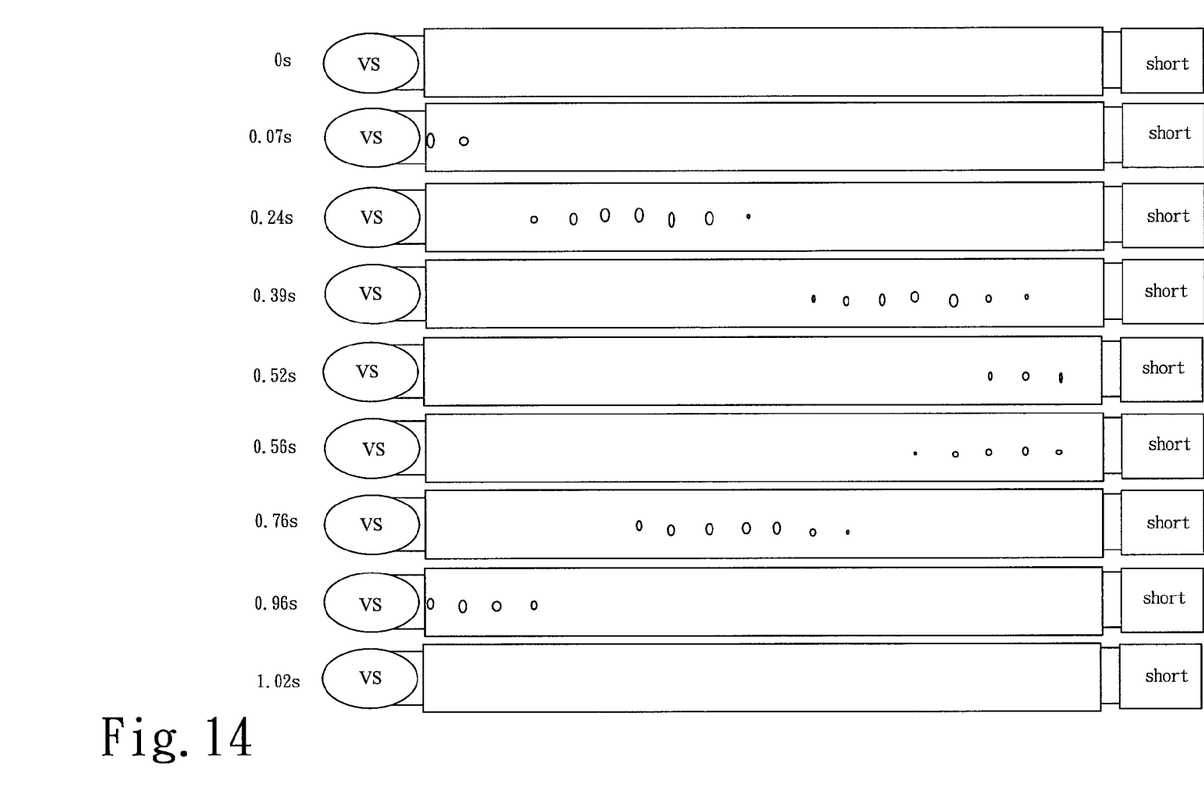
FIG. 14 is a diagram schematically showing a LED module radiating to represent an electromagnetic wave in a transmission line when a load module is short circuit according to an embodiment of the present invention.

Refer to FIG. 1 and FIG. 14. In FIG. 14, the AC voltage VS has an amplitude of 90 mV and a frequency of 10 Hz, and a large circle denotes high brightness, and a small circle denotes low brightness. FIG. 14 shows the lighting states of the LED modules 16 after 0 s, 0.07 s, 0.24 s, 0.39 s, 0.52 s, 0.56 s, 0.76 s, 0.96 s and 1.02 s. From FIG. 14, it is known that the wave inversely propagates in the transmission line module 12 and the color of the LEDs representing the wave changes. In other words, there is the phase difference of 180 degrees between an incident wave and a reflection wave. As a result, FIG. 14 complies with the transmission line theory.

In FIG. 1, each of the first transmission line submodule 36, the second transmission line submodule 38 and the third transmission line submodule 40 includes an inductor and a capacitor. In addition, each of the first transmission line submodule 36, the second transmission line submodule 38 and the third transmission line submodule 40 alternatively includes two inductors and a capacitor, so that an equivalent circuit of the transmission line module 12 is the same to FIG. 2.

In the first transmission line submodule 36, the first pin header 56 is omitted whereby the first capacitor 54 is directly arranged on and electrically connected with the second circuit board 50. In the second transmission line submodule 38, the second pin header 64 is omitted whereby the second capacitor 62 is directly arranged on and electrically connected with the third circuit board 58. In the third transmission line submodule 40, the third pin header 72 is omitted whereby the third capacitor 70 is directly arranged on and electrically connected with the fourth circuit board 66. In the load module 14, the fourth pin header 78 is omitted whereby the resistor 76 is directly arranged on and electrically connected with the fifth circuit board 74. In this way, although the user can not freely change the characteristic impedance and the loading impedance, the LED modules 16 are used to observe the behavior of the electromagnetic wave in the transmission line module 12.

When the length of the transmission line module 12 is too short, the electromagnetic wave easily and directly drives the LED modules 16. Thus, the second banana plugs 34 are omitted in the power input module 10, and the amplifier circuit 86 is omitted in the LED module 16. Then, the anode of the first LED 82 and the cathode of the second LED 84 are directly and electrically connected with the sixth connection port 28.

In conclusion, not limited by types of a transmission line of software, the present invention directly realizes the variation and movement of the electromagnetic wave in the transmission line. Additionally, the user can freely change the parameters and shape of the transmission line to overcome the problem with abstract formulas and improve interactivity with tools.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A modular transmission line device comprising:
a power input module having a first connection port and receiving an alternative-current (AC) voltage;
a transmission line module having a second connection port, a third connection port and a plurality of fourth connection ports, and said second connection port is electrically connected with said first connection port to transmit said AC voltage to said transmission line module;
a load module having a fifth connection port, and said fifth connection port is electrically connected with said third connection port to transmit said AC voltage to said load module, and said AC voltage is used to generate an electromagnetic wave in said transmission line module according to a loading impedance of said load module and a characteristic impedance of said transmission line module; and
a plurality of light-emitting diodes (LED) modules each having a sixth connection port, and said sixth connection ports of said LED modules are respectively elec- trically connected with said fourth connection ports, and said LED modules radiate according to said electromagnetic wave.

2. The modular transmission line device according to claim 1, wherein said power input module further comprises:
   a first circuit board provided with said first connection port and electrically connected with said first connection port; and
   two first banana plugs arranged on said first circuit board and electrically connected with said first connection port through said first circuit board, and said first banana plugs receive said AC voltage.

3. The modular transmission line device according to claim 2, wherein said transmission line module further comprises:
   a first transmission line submodule having one said fourth connection port, said second connection port and a seventh connection port;
   a plurality of second transmission line submodules each having one said fourth connection port, a eighth connection port and a ninth connection port, and said second transmission line submodules are connected in series and electrically connected through said eighth connection port and said ninth connection port, and said second transmission line submodules are electrically connected with said first transmission line submodule through said seventh connection port and said eighth connection port; and
   a third transmission line submodule having one said fourth connection port, said third connection port and a tenth connection port and electrically connected with said second transmission line submodules through said ninth connection port and said tenth connection port, and said first transmission line submodule, said second transmission line submodules and said third transmission line submodule have said characteristic impedance and receive said AC voltage, and said electromagnetic wave is generated in said first transmission line submodule, said second transmission line submodules and said third transmission line submodule.

4. The modular transmission line device according to claim 3, wherein said first transmission line submodule further comprises:
   a second circuit board provided with said fourth connection port, said second connection port and said seventh connection port and electrically connected with said fourth connection port, said second connection port and said seventh connection port; and
   a first inductor and a first capacitor arranged on said second circuit board, and one end of said first inductor is electrically connected with said second connection port, and another end of said first inductor is electrically connected with said seventh connection port and electrically connected with a grounding terminal through said first capacitor;
each said second transmission line submodule further comprises:
   a third circuit board provided with said fourth connection port, said eighth connection port and said ninth connection port and electrically connected with said fourth connection port, said eighth connection port and said ninth connection port; and
   a second inductor and a second capacitor arranged on said third circuit board, and one end of said second inductor is electrically connected with said eighth connection port, and another end of said second inductor is electrically connected with said ninth connection port and electrically connected with said grounding terminal through said second capacitor; and
said third transmission line submodule further comprises:
   a fourth circuit board provided with said fourth connection port, said third connection port and said tenth connection port and electrically connected with said fourth connection port, said third connection port and said tenth connection port; and
   a third inductor and a third capacitor arranged on said fourth circuit board, and one end of said third inductor is electrically connected with said third connection port, and another end of said third inductor is electrically connected with said tenth connection port and electrically connected with said grounding terminal through said third capacitor, and said first capacitor, said second capacitors, said third capacitor, said first inductor, said second inductors and said third inductor have said characteristic impedance, and said electromagnetic wave is generated in said first capacitor, said second capacitors, said third capacitor, said first inductor, said second inductors and said third inductor.

5. The modular transmission line device according to claim 4, wherein said first transmission line submodule further comprises a first pin header electrically connected with said second circuit board, and said first capacitor is arranged on and electrically connected with said first pin header; said second transmission line submodule further comprises a second pin header electrically connected with said third circuit board, and said second capacitor is arranged on and electrically connected with said second pin header; and said third transmission line submodule further comprises a third pin header electrically connected with said fourth circuit board, and said third capacitor is arranged on and electrically connected with said third pin header.

6. The modular transmission line device according to claim 5, wherein said load module further comprises:
   a fifth circuit board provided with said fifth connection port and electrically connected with said fifth connection port; and
   a resistor arranged on said fifth circuit board, and one end of said resistor is electrically connected with said fifth connection port, and another end of said resistor is electrically connected with said grounding terminal, and said resistor receives said AC voltage, and said resistor has said loading impedance.

7. The modular transmission line device according to claim 6, wherein said load module further comprises a fourth pin header electrically connected with said fifth circuit board, and said resistor is arranged on and electrically connected with said fourth pin header.

8. The modular transmission line device according to claim 6, wherein each said LED module further comprises:
   a sixth circuit board provided with said sixth connection port and electrically connected with said sixth connection port;
   a first LED arranged on said sixth circuit board, and an anode and a cathode of said first LED are respectively electrically connected with said sixth connection port and said grounding terminal, and said first LED radiates according to said electromagnetic wave; and
   a second LED arranged on said sixth circuit board, and a cathode and an anode of said second LED are respectively electrically connected with said sixth connection port and said grounding terminal, and said second LED radiates according to said electromagnetic wave, and said first LED and said second LED are of different color.

9. The modular transmission line device according to claim 8, wherein said power input module further comprises two second banana plugs arranged on said first circuit board and electrically connected with said first connection port through said first circuit board, and said second banana plugs receive a direct-current (DC) voltage; and each said LED module further comprises an amplifier circuit arranged on said sixth circuit board, said anode of said first LED and said cathode of said second LED are electrically connected with said sixth connection port through said amplifier circuit, said amplifier circuit receives said DC voltage to amplify said electromagnetic wave, and then transmits said electromagnetic wave to said first LED or said second LED.

10. The modular transmission line device according to claim 9, wherein said first circuit board, said second circuit board, said third circuit board, said fourth circuit board, said fifth circuit board, and said sixth circuit board are printed circuit boards (PCBs).

11. The modular transmission line device according to claim 9, wherein said first connection port, said second connection port, said third connection port, said fourth connection port, said fifth connection port, said sixth connection port, said seventh connection port, said eighth connection port, said ninth connection port and said tenth connection port are USB ports.

12. The modular transmission line device according to claim 9, wherein said first LED and said second LED are respectively a red LED and a green LED.

\* \* \* \* \*